United States Patent [19]
Katz

[11] Patent Number: 6,075,560
[45] Date of Patent: *Jun. 13, 2000

[54] ASYNCHRONOUS VIDEO EVENT AND TRANSACTION DATA MULTIPLEXING TECHNIQUE FOR SURVEILLANCE SYSTEMS

[76] Inventor: Barry Katz, 503 Cindy Cir., Penllyn, Pa. 19422

[*] Notice: This patent is subject to a terminal disclaimer.

[21] Appl. No.: 09/262,527

[22] Filed: Mar. 4, 1999

Related U.S. Application Data

[63] Continuation of application No. 08/964,305, Nov. 4, 1997, Pat. No. 5,920,338, which is a continuation of application No. 08/741,308, Oct. 30, 1996, abandoned, which is a continuation of application No. 08/232,363, Apr. 25, 1994, abandoned.

[51] Int. Cl.[7] ........................................... H04N 7/18
[52] U.S. Cl. .............................................. 348/150; 348/161
[58] Field of Search ....................................... 348/150, 161, 348/143, 149, 151, 152, 154, 156, 155, 157, 158, 160, 153; 360/14.1, 14.2, 14.3; 386/4, 52, 46, 61, 62, 64, 66, 95; H04N 7/18

*Primary Examiner*—Young Lee
*Attorney, Agent, or Firm*—Eugene E. Renz, Jr. P.C.

[57] ABSTRACT

A surveillance system which can store and replay information which is not generated contemporaneously. In some point-of-sale systems, the behavioral events occur before the transaction data is generated. The present system asynchronously records the video signals corresponding to the behavioral events and the transaction data. Upon playback, the transaction data is matched up with the behavioral event being replayed from the video tape.

5 Claims, 9 Drawing Sheets

ASYNCHRONOUS VIDEO EVENT AND TRANSACTION DATA MULTIPLEXING TECHNIQUE FOR SURVEILLANCE SYSTEMS

FIELD OF THE INVENTION

This application is a continuation to U.S. application Ser. No. 08/964,305 filed Nov. 4, 1997, U.S. Pat. No. 5,920,338 of which is a continuation to U.S. application Ser. No. 08/741,308 filed Oct. 30, 1996, abandoned of which is a continuation of U.S. application Ser. No. 08/232,363 filed Apr. 25, 1994, abandoned.

This invention relates to surveillance systems that record transaction events for review at a later date. More specifically, this invention relates to an asynchronous video event and transaction data multiplexing technique for such a surveillance system.

BACKGROUND OF THE INVENTION

The use of surveillance systems to record cash transactions for later review are well known in the art. For example, U.S. Pat. No. 4,337,482, to Coutta, discloses a surveillance system that monitors and records transactions that occur at a number of cashier lanes. In Coutta, a single television camera, mounted on a rail, can be positioned to make a video recording of the transactions that occur at a single selected cashier lane. Coutta discloses that the digital transaction data from the cash register in the selected cashier lane is fed into a video character generator to provide a composite video picture in which an alphanumeric display of the transaction data overlays the video image of the transaction. Since a composite video image is generated with respect to only one cashier lane, it is usually possible to position the camera so that the alphanumeric overlay does not obscure a useful portion of the recorded video image. However, if a single camera is used to record simultaneously the transactions that occur at a plurality of cashier lanes, it is likely that the alphanumeric overlay data will obscure an important part of the video image of at least one of the transaction lanes. This likelihood is further increased when a large number of parameters are displayed simultaneously for all of the cashier lanes.

In U.S. Pat. No. 4,630,110, to Cotton et al., a surveillance system is disclosed which monitors and records the single lane from a plurality of video cameras. In one embodiment of Cotton et al. the video image from four cameras are combined, with two of the cameras being focused on cash registers. Cotton et al. discloses that textual data can be displayed at the lower portion of the combined video picture.

Another surveillance system disclosed in U.S. Pat. No. 4,145,715, to Clever, generates two levels of surveillance records. The first level, generated by a tape recorder, contains a record of all transactions. The second level generated on the tape recorder contains only selected transactions. In Clever, transaction data such as the price and department number are input to a character generator. The character generator output is mixed with the video image to create a composite video frame. This composite video frame consists of alphanumeric transaction data which overlays the transaction video image. This composite video frame is then recorded by the video tape recorder onto video tape.

Although Clever discloses that a single camera can be used to scan several point-of-sale (POS) stations, the video image that is generated contains alphanumeric transaction data that is permanently overlaid on the video image. This is because the composite video frame is generated before recording on video tape. This overlay can degrade the clarity of the resultant video images if the transaction data is placed over the video image corresponding to a particular cashier lane. Alternatively, a portion of the video may be blacked out so that the transaction data can be more easily read when viewed at a later time on the monitor. In this instance, the blacked out portion is recorded over a portion of the image being recorded by the television camera. In this situation, the portion of the video image which was blacked out is lost forever.

As the devices that perform data entry (cash registers, data terminals, optical character readers, radio frequency readers, magnetic media readers, etc.) become more sophisticated, larger quantities of alphanumeric characters describing the transaction are generated. The increase in information would further tend to clutter and obscure the composite video image. As the number of lanes being recorded increases, it becomes more difficult to overlay all of the alphanumeric transaction data at positions that will not obscure an important part of the video transaction image. The clarity of the video image of a transaction is particularly important when the transaction lanes are outdoors and are recorded under varying light and weather conditions.

In my earlier patent, U.S. Pat. No. 5,216,502, the transaction data and video pictures of the transaction behavior are recorded synchronously but separately on media capable of storing a full motion video.

The aforementioned patents require that the transaction data be available at the time that the behavior is being recorded. However, there are certain applications where this technology cannot be applied. For example, in situations where the point-of-sale system buffers the transaction data until the termination of the transaction, or at the termination of several transactions. At the end of the transaction, the data is transmitted from the terminal to the host. Accordingly, the transaction information cannot be recorded synchronously with the video pictures of the transaction.

SUMMARY OF THE INVENTION

It is an object of this invention to provide an improved surveillance system.

It is a further object to provide an asynchronous surveillance system.

A surveillance system for reviewing transaction events which occur at one or more check outs or operation stations is disclosed. Light recordings, (i.e., anything that records light/images including video and television cameras) are made of transaction events occurring at a point-of-sale terminal or other operation station. A video camera or the like generates video signals corresponding to the behavioral events occurring at the terminal. A sensor means at the operation station generates digital signals representing the transaction events occurring at the terminal. The sensor means can be a cash register, a toll booth register, a machine that automatically receives money at toll plazas, or machines that can read a bar code printed on an item (bar code scanners). A means for generating a synchronizing signal (usually from an independent clock or from the point-of-sale terminal's clock) is required.

A first recording means synchronously stores the digital signals from the sensor means including any operation station identifier, time, date, camera identification and data source identification with the video signals generated by the video camera. The first recording means must also store the synchronizing signal. The digital signals are stored separately on the video tape so as not to degrade either the digital signals or the video signals.

A second recording means stores the digital signals along with all other event or transaction data. The second recording means also stores the synchronizing signals.

A playback means retrieves the information saved by the two storage devices; i.e., the video signals and the digital signals from the first recording means and the digital signals from the second recording means. If the first and second recording means use different storage media, two different playback means may be required. A control means, responsive to an input signal (usually from an operator at a computer), generates a composite video signal. The composite video signal includes signals representing alphanumeric displays of the transaction data corresponding to the desired behavioral events. The control means synchronizes the digital data from the second recording means with the composite video signal by comparing the synchronizing through the signals stored by both recording means. The synchronizing signals can be an independently generated timing signal, transaction sequence number or any other identifying media. Finally, a monitor is used to display the composite video signal.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

The format of transmitting and storing transaction information used by manufacturers of cash registers and other data entry terminals is extremely diverse. Some systems immediately transmit the transaction data to a host computer after every item is "rung up" or scanned. Previous surveillance systems would tap into the wires or bus connecting the cash register to the host computer, and record the transaction data contemporaneously with the behavioral events recorded by a television camera. One of the more advanced surveillance systems of this type was disclosed in U.S. application Ser. No. 07/629,255, filed Dec. 18, 1990, which issued on Jun. 1, 1993, as U.S. Pat. No. 5,216,502. U.S. application Ser. No. 07/629,255, now U.S. Pat. No. 5,216,502 is incorporated by reference as if fully set forth herein.

Figure 1:
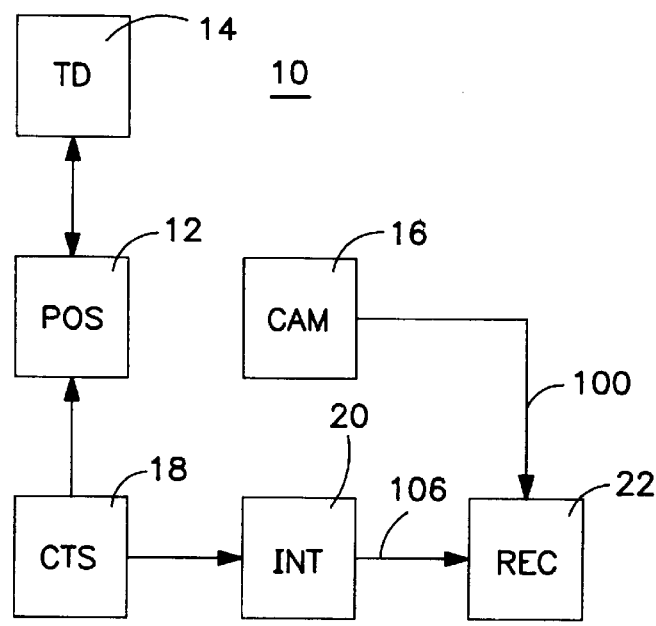
FIG. 1 is a schematic block diagram of a surveillance and transaction recording system in accordance with the instant invention.

FIG. 1 is a block diagram of the preferred embodiment of the recording portion of the Asynchronous Video Event and Transaction Data Multiplexing (AVETDM) surveillance/recording system in accordance with the present invention. The surveillance system can be used in different environments such as a retail environment (grocery stores, convenience stores, music/specialty stores, etc.), automotive vehicle toll booths employed at turnpikes, tunnels and bridges, and electronic guard tours. It is especially well suited for point-of-sale terminals which delay the transmission of the transaction information until the completion of a customer transaction or after several customer transactions.

In applications where the transaction data is sent to a host at the conclusion of the transaction, i.e. when the total amount due is calculated upon the depression of a tender key, or when the sale to an individual customer is consummated, the transaction information with respect to individual items is bundled or packaged. This bundle is then sent to the appropriate storage device (e.g. a host computer) after the entire transaction is completed. For example, one system sends the data in 128 byte packets when the tender key is depressed.

The recording system of the present invention can generally be indicated at 10. The transaction events occur at a point-of-sale (POS) station or terminal 12. For example, the POS 12 can be an automatic teller machine, cash register, toll booth or other system. The transaction information is stored in a transaction database 14. The transaction database 14 can be a computer with the information stored on a magnetic medium. A camera 16 is positioned so that it can view the customer's behavior at at least one POS 12. The AVETDM requires a synchronizing signal. In the preferred embodiment, the Synchronizing signal is generated by a common time source 18 which provides the synchronizing information for the transaction database 14 and an interface 20. The common time source can be as independent clock, e.g. a clock synchronized with the atomic clock of the National Institute of Standards and Technology (NIST). Alternatively, the recording system can use the clock of the POS 12.

The interface 20 receives a synchronizing signal from the common time source and converts it to a form that can be recorded with the video signals from camera 16. The interface 20 may also place some static data on the recording to describe the store location, camera number/position or other indicia.

Recording device 22 records the video signal from camera 16 and the coded data signals (including the synchronizing signal) from the interface 20. The recording device 22 may be a video cassette recorder, video disc, or a computer-based video capture system. The present system may have more than one recording device 22. Typically, one recorder 22 is required for each camera. However, some camera systems use various video combining and multiplexing technics to allow a single recording device 22 to record information from multiple cameras.

The recording device 22 records the information from the interface in such a manner as to preserve the entire video signal generated by camera 16. For instance, if the recording device 22 is a video cassette recorder, the video signals are stored on the video portion of the video tape, while the coded data signals from interface 20 may be recorded on the audio portion of the video tape.

Figure 2:
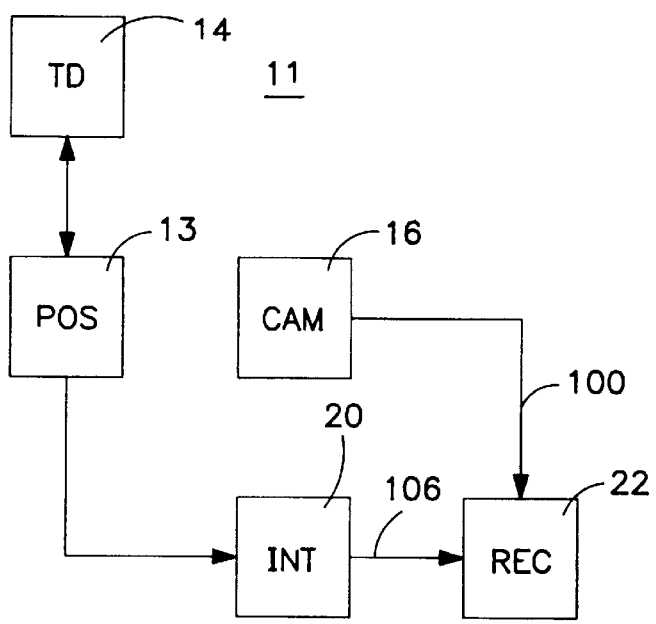
FIG. 2 is a schematic block diagram of an alternative system for receiving time synchronization information for use in a surveillance system in accordance with the present invention.

An alternative recording system 11 of the AVETDM system is shown in FIG. 2. Like devices are similarly numbered. In FIG. 2, the point-of-sale system 13 generates its own synchronizing signal which is input into the interface 20 and the transaction database 14. Preferably, the synchronizing signal is a timing signal from an internal clock. However, sequencing information or other data may be used. The POS generated signal is used to synchronize the video or behavior information stored on recording device 22 with the transaction information stored on transaction database 14. In this alternative embodiment, a separate independent synchronizing source is not required.

Figure 3:
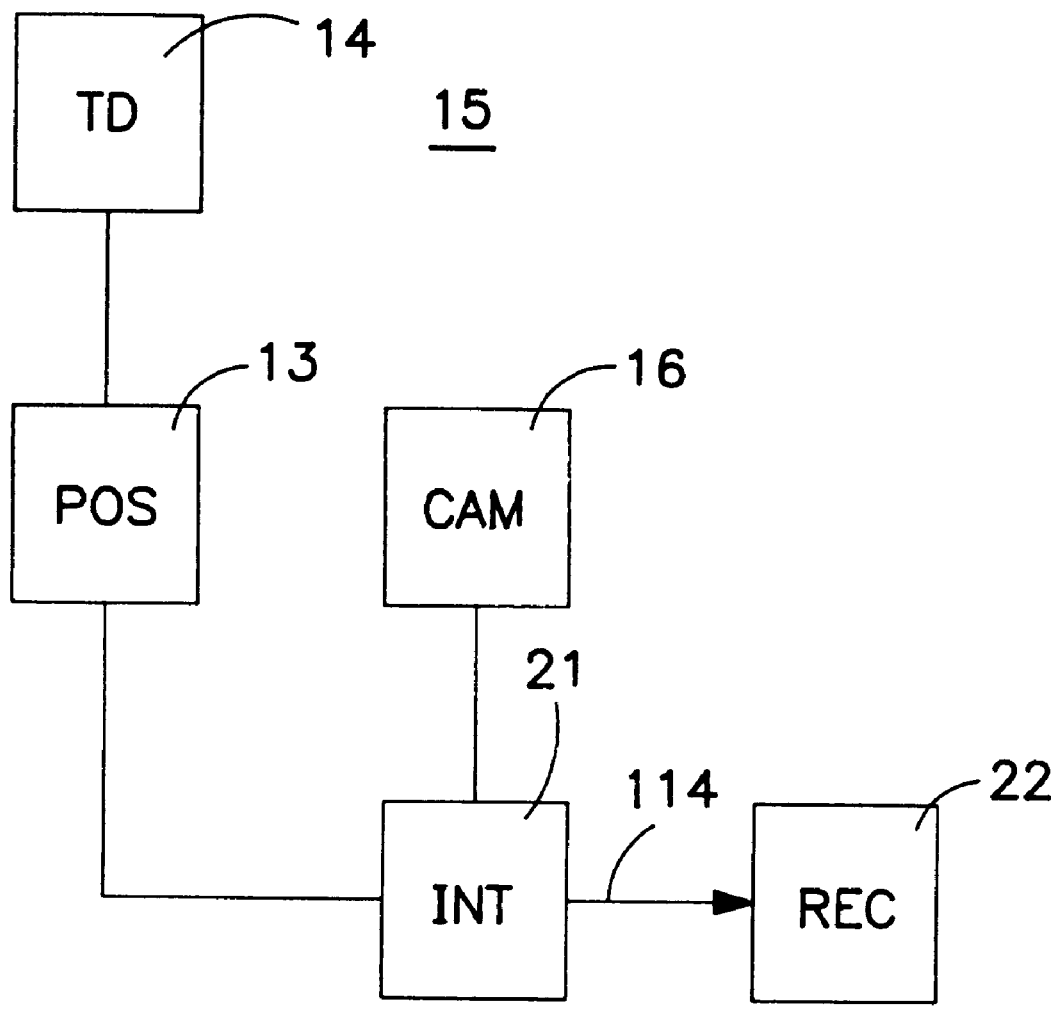
FIG. 3 is a schematic block diagram of an alternative system for recording the behavioral events in accordance with the present invention.

Referring now to FIG. 3, a second alternative recording system 15 is shown. Again, like elements are similarly numbered. In this embodiment, the interface 21 combines the video signal from camera 16 and the synchronizing data signal generated by the POS 13 into a combined video/data signal. The recording device 22 records the combined video/data signal. It is preferable that the interface 21 combines the video and data information in such a manner that all of the information is preserved. The transaction database 14 stores all of the transaction data along with the synchronizing signal from POS 13.

Figure 4:
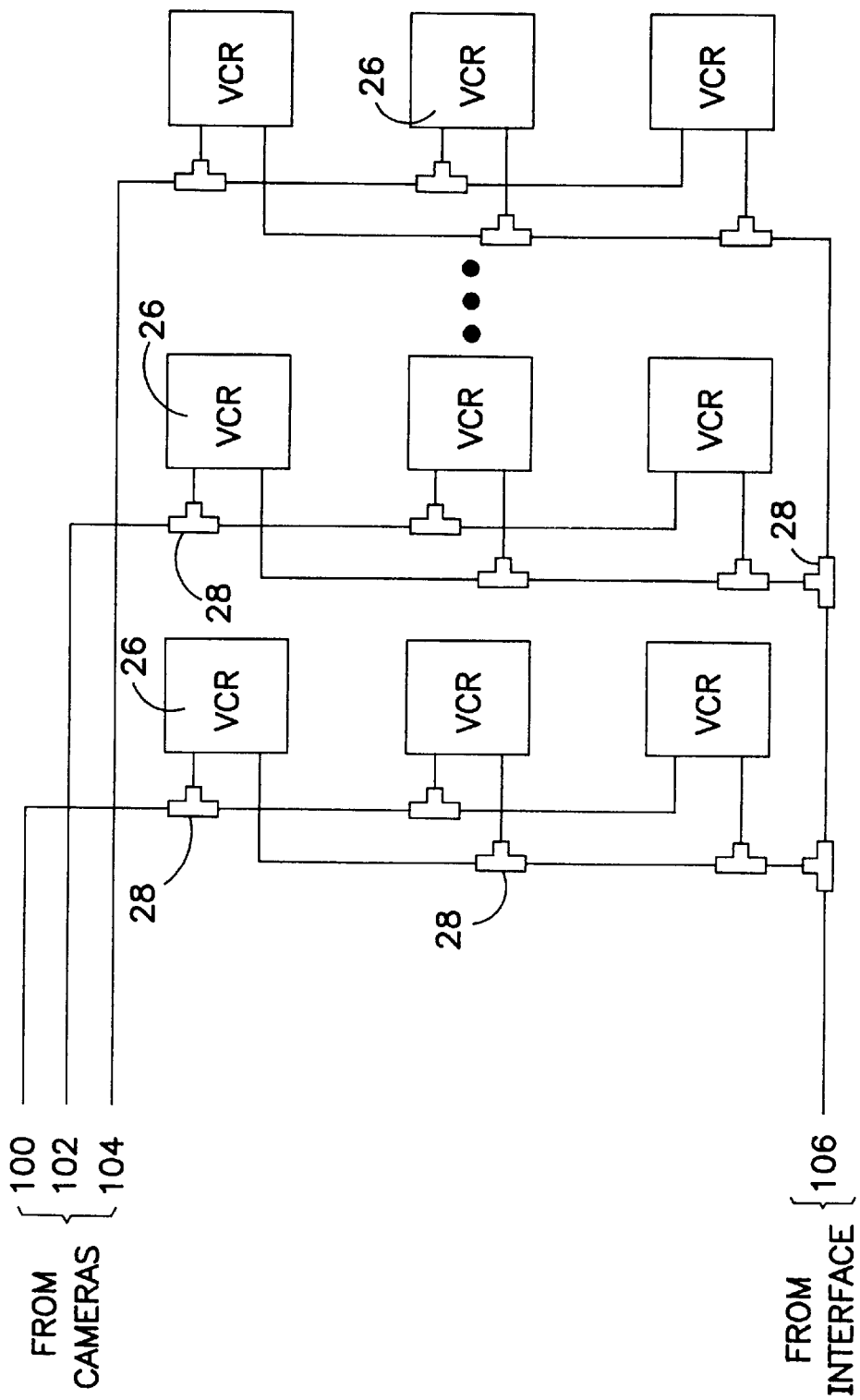
FIG. 4 is a schematic block diagram of a system for recording transactions continuously for an extended period of time.

Referring now to FIG. 4, an embodiment is disclosed which allows twenty-four hour coverage of the POS station for an extended period of time. In this situation, the recording device of choice is a VCR 26. Each VCR 26 can record eight hours of behavioral events occurring at the POS. Therefore, a bank of three VCRs can provide twenty-four hour coverage. Splitters or T's 28 split the video signal from lines 100, 102 and 104 from the cameras. If the data from the interface is stored on the audio channel, similar T's 28 may be used to input the synchronizing or data signal to all VCRs 26 from line 106. The embodiment disclosed in FIG. 4 can be used with the recording system shown in FIG. 1 or FIG. 2.

Figure 5:
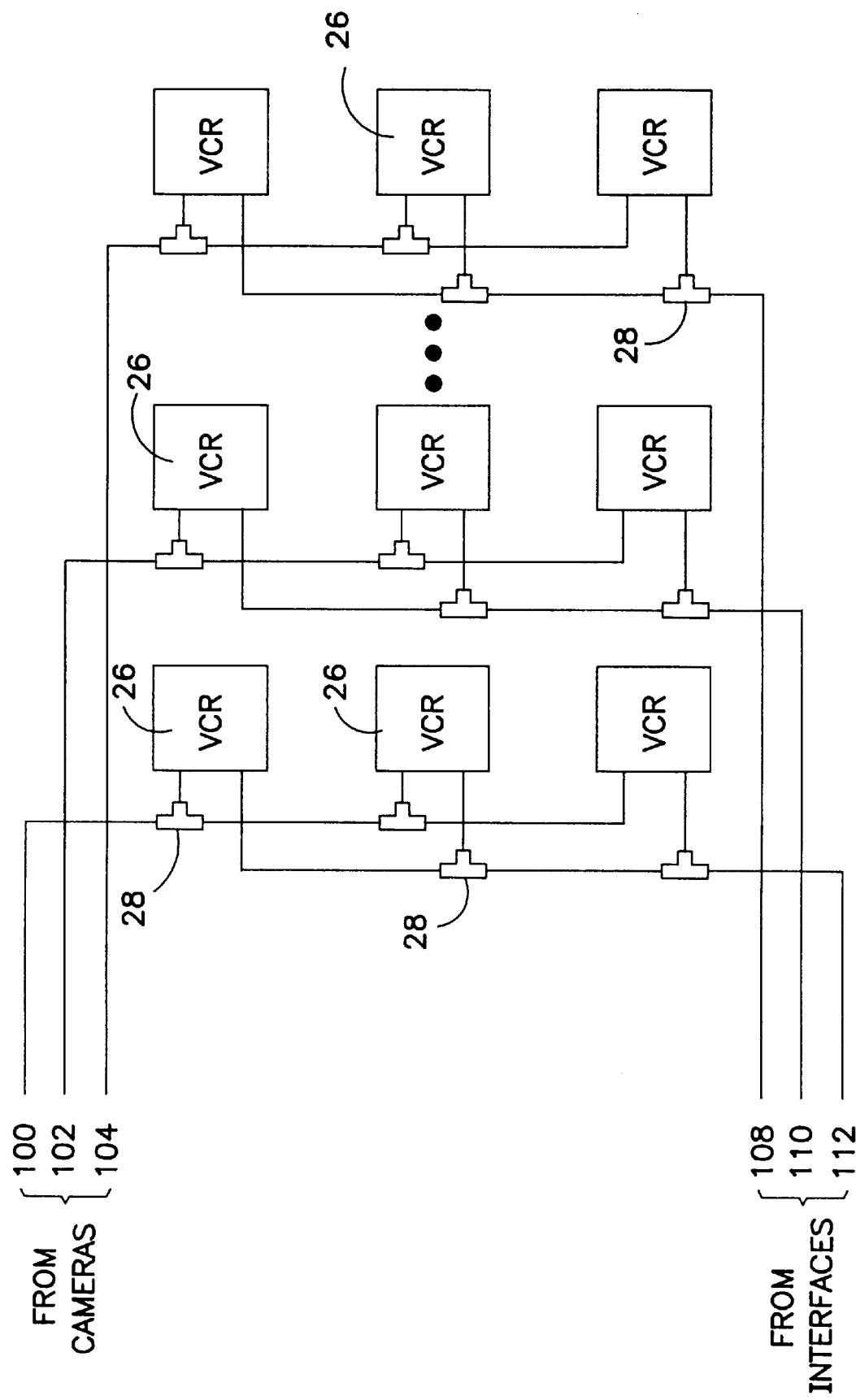
FIG. 5 is a schematic block diagram of an alternative system for recording transactions from a plurality of transaction lanes continuously for an extended period of time.

In FIG. 5, a schematic diagram of an alternate recording system using a plurality of interfaces is shown.

Figure 6:
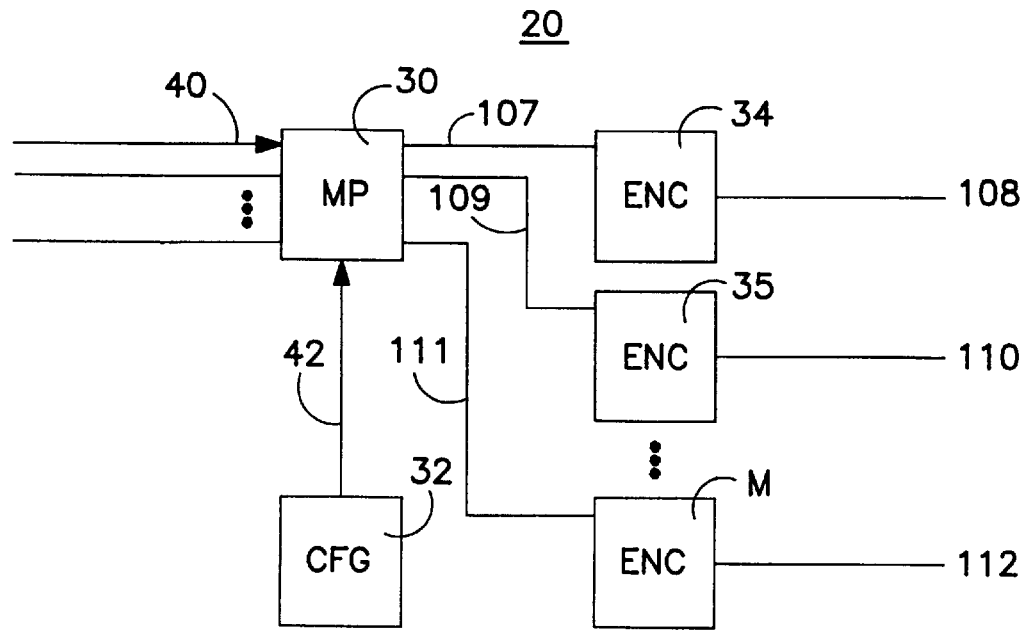
FIG. 6 is a schematic block diagram of the interface configuration.

The preferred configuration of the interface 20 is shown in FIG. 6. A configuration terminal 32 or other controlling system is connected to a microprocessor 30. The synchronizing data, e.g. timing information, enters the. microprocessor 30 at input 40. The outputs 107, 109 and 111 of the microprocessor 30 are connected to various data encoders 34, 35 ... M. The type of data encoders 34, 35 used, depends on the recorder 22. For example, if the recorder 22 is a VCR, the data encoder may be a Data Based Security AM 90.

Figure 7:
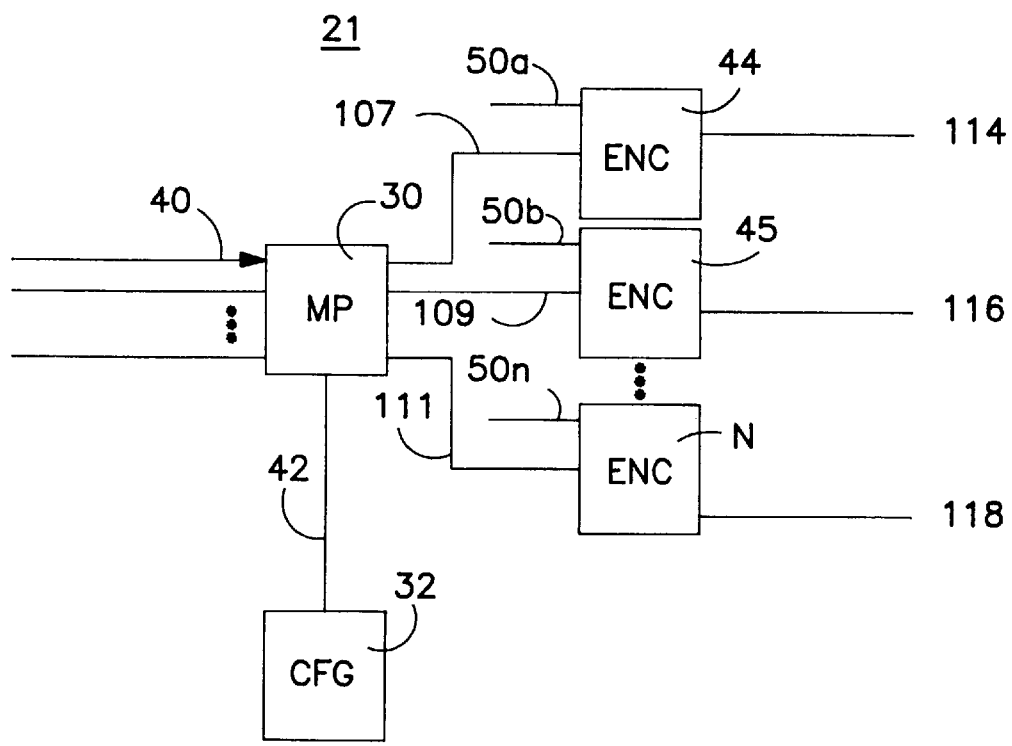
FIG. 7 is a block diagram of an alternative configuration of the interface.

FIG. 7 shows an alternate interface circuit 21, which is used in connection with the alternate recording system as shown in FIG. 3. Again, the configuration terminal or other controlling system 32 is connected to the microprocessor 30 via line 42. The raw data, including the synchronizing data, coming from the POS 13 is input at 40 to the microprocessor 30. The outputs 107, 109 and 111 of the microprocessors 30 are connected to the encoders 44, 45 ... N. The video signal from the camera 16 is also input into the encoder at 50. The inputs may all be from one camera (in which case 50a, 50b and 50n are connected by splitters or T's) or alternatively each video input 50 may be connected to an individual camera. The encoders 44, 45 ... N produce an encoded combination of the video and data. Again, this encoded information is generated in such a way that the entire data information and video information are not degraded. The outputs 114, 116 and 118 of the encoders are connected to the input of a recording device 22. For example, if the recording device used is a VCR, the arrangement as shown in FIG. 8 may be used.

Figure 8:
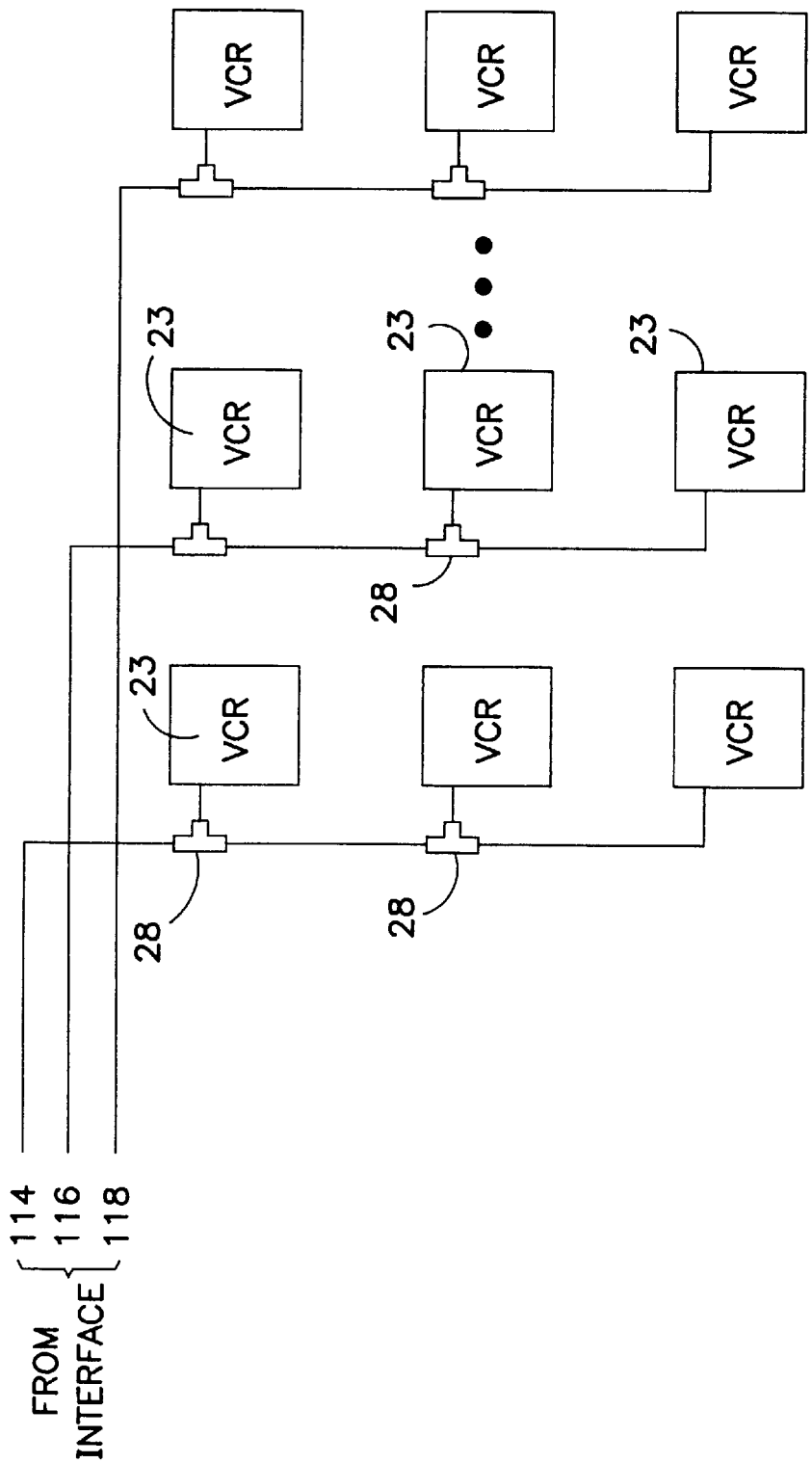
FIG. 8 is a block diagram of an alternative system for recording transactions for an extended period of time which may be used with the system shown in FIG. 3.

FIG. 8 shows an alternative embodiment which will allows an extended time coverage of the POS stations for use with the system shown in FIGS. 3 and 7. In this case, the behavior data generated by camera 16 is combined with the transaction data before recording on VCR 23. Splitters 28 direct the combined signal from the interface to each bank of VCRs.

Figure 9:
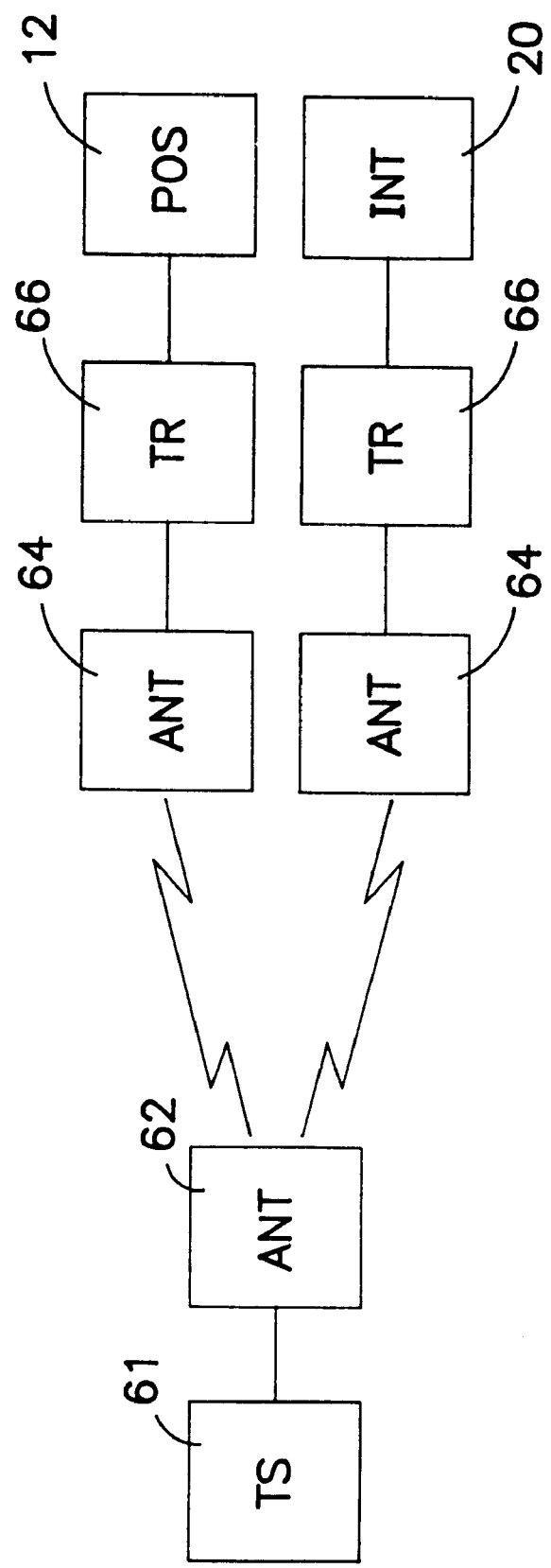
FIG. 9 is a block diagram of the instant invention using a common time source.

Referring now to FIG. 9, an independent time source, as may be used in the system of FIG. 1, is shown. In this example, the time source 61 is the atomic clock supported by the National Institute of Standards and Technology. The time source 61 generates a real time signal. The time source 61 is connected to an antenna 62, which transmits, via wireless technology, the time signal. Receiving antennas 64 amplify the received timing signal and forwards the timing signal to a time receiving box 66. The time receiving boxes 66 condition the timing signal in manner that the POS 13 and the interface 20 can better utilize the timing signal. A serial interface (not shown) may be used to connect the time receiving boxes to the POS 12 and the interface 20. In this manner, the transaction database 14 and the recording mechanism 22 store the exact time simultaneously. Upon playback of the transaction data and the recording medium, the timing signal will be used to synchronize the transaction information with the behavioral information.

Figure 10:
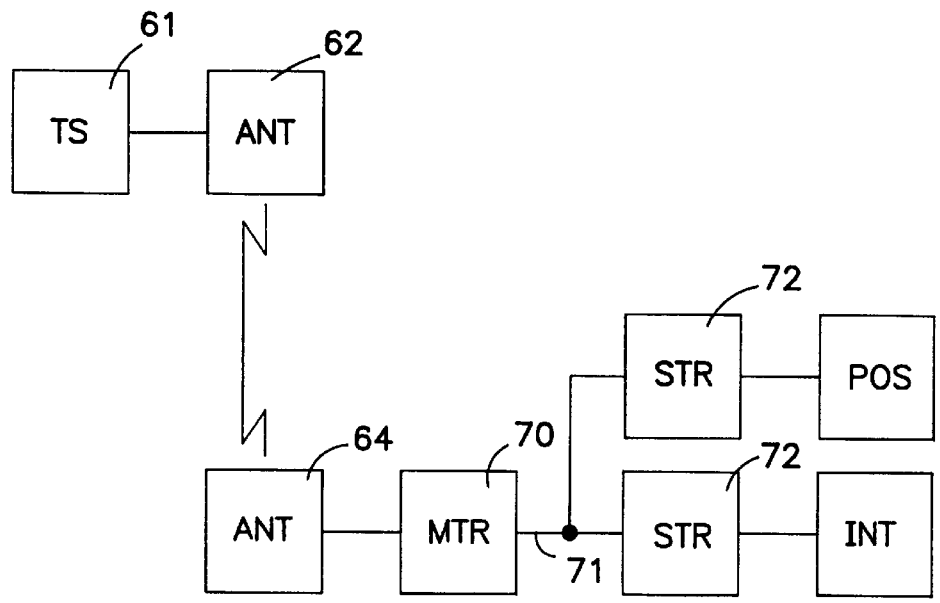
FIG. 10 is a block diagram of an alternative system using a common time source.

In FIG. 10, an alternative common time source is shown. In this system, a master time receiver 70 is connected to receive antenna 64. The output 71 of the master time receiver 70 is connected to a plurality of slave time receivers 72. The slave time receivers 72 are connected to the POS 12 and the interface 20. Again, the transaction database 14 and the recording mechanism 22 record the exact time which can be used to synchronize the data during playback.

Figure 11:
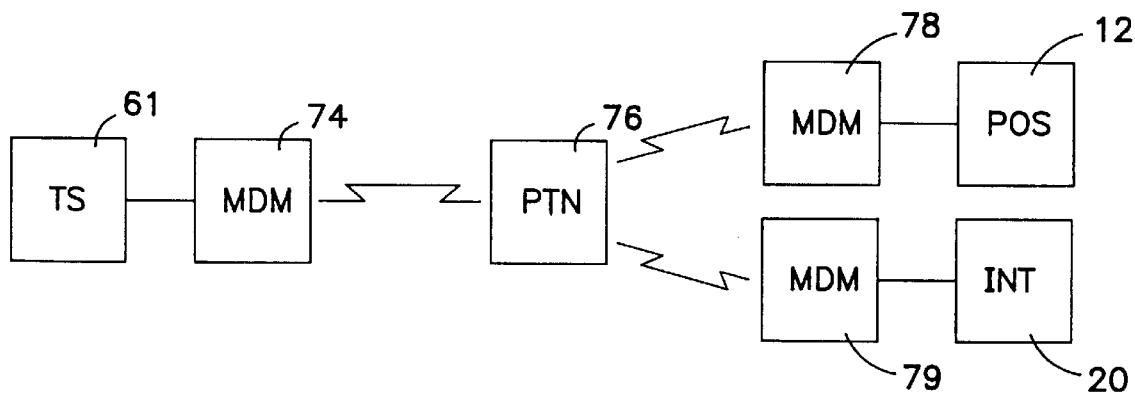
FIG. 11 is a block diagram of a second alternative system using a common time source.

FIG. 11 is a second alternative common time source circuit. The time source 61 is connected to a modem 74. The modem 74 is connected in the usual manner via telephone lines to a public telephone network 76. The surveillance system also has modems 78 and 79 which are connected to the public telephone network 76. The modem 78 and 79 are connected to the POS 12 and the interface 20 respectively.

Figure 12:
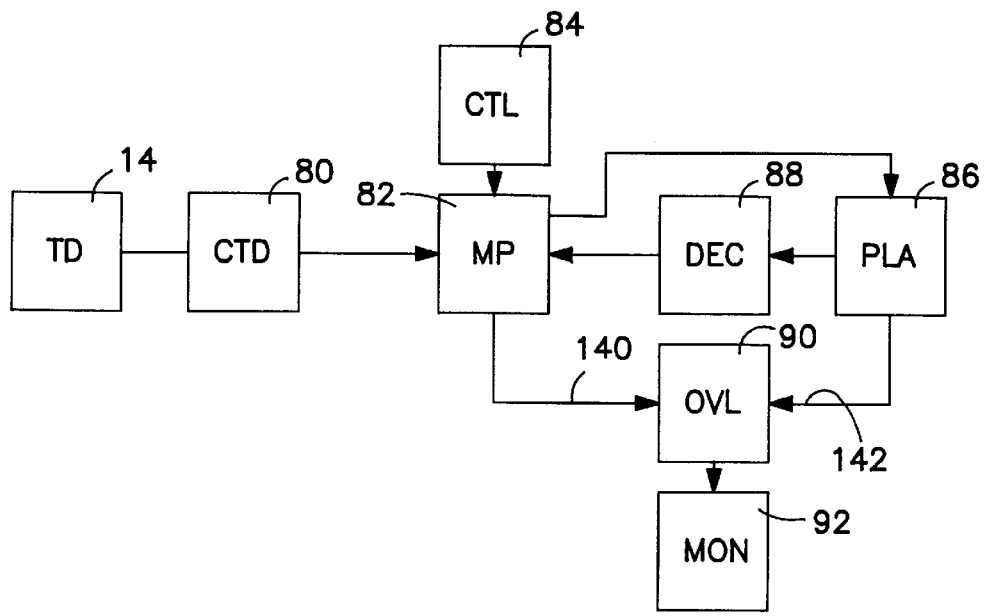
FIG. 12 is a replay station used to review the transactions.

The AVETDM playback system is shown in FIG. 12. The transaction database 14 is connected to a compatible transaction database 80. Compatible transaction database 80 converts the transaction information and the synchronizing signal stored on the transaction database 14 during the recording period into a compatible format. The compatible transaction database 80 is connected to a microprocessor 82. The microprocessor controller 84 is directly connected to the microprocessor 82. In the preferred embodiment, the controller 84 and the microprocessor 82 are an off-the-shelf computer, for example, an IBM compatible 486 computer. In this case, the controller 84 is the terminal and keyboard of the computer.

All of the transaction data is downloaded into a database the microprocessor 82. This information is then accessed by the microprocessor 82 at the appropriate time. An alternate system (not shown) can have the microprocessor 82 controlling the transaction database 14 to download the data when needed.

An output of the microprocessor 82 is connected to a playback mechanism 86. The playback mechanism 86 must be compatible to the format of the behavioral information stored by the recording medium 22. For example, if the recording medium 22 is a VCR, the playback mechanism 26 will be a VCR also. The output of the playback mechanism 86 is connected to a decoder 88. The decoder 88 decodes the synchronizing data from the playback device 86. An output of the decoder 88 is fed to the microprocessor 82.

The microprocessor 82 using the synchronizing signal, e.g. the timing signal which was stored by the transaction database 14 and the recording medium 22, synchronizes the behavioral/video information with the transaction data. The microprocessor 82 outputs a video overlay signal to an overlay control box 90 via line 140. The stored video signal from camera 16 is reconstituted by the playback medium 86. The video signal contains the behavioral events which occurred at the POS 12, e.g. a person purchasing their groceries or a truck paying a toll. The video signal is input to the overlay control box 90 via line 142. The overlay control box 90 produces a composite signal which includes the behavioral information being overlaid with the preferred transaction data. The composite signal is displayed on monitor 92.

The operator at controller 84 decides which behavioral events and which transaction events to view. The operator may have a menu of events to choose. For example, the operator may wish to view the events at cashier number five. The microprocessor 82 controls the playback device 86 to output the video signals corresponding to cashier number five. Normally, all of the transaction data is downloaded into the microprocessor 82. The transaction events which correspond to the transactions at cashier number five are then recalled. The microprocessor then outputs the appropriate data to the overlay control box 90.

The microprocessor has both synchronizing signals, which were stored during the recording session (see FIG. 1), available to process. That is the synchronizing data stored by the transaction database 14, and the synchronizing data stored by the recording mechanism 22 are both input to the microprocessor 82. Therefore, the microprocessor 82 matches up or synchronizes the behavioral events (video information) with the asynchronously stored transaction events.

Since the microprocessor 82 has available to it all of the transaction data recorded onto the transaction database 14, it is possible for the operator to look into the "future". For example, the operator may wish to look at all transactions at cashier number five in which a customer uses a credit card. The operator can direct the microprocessor 82 to look for the credit card transactions. Therefore, while the playback device 86 is showing behavioral events taking place at the "present" time, the microprocessor 82 can inform the operator that a credit card transaction will take place in twelve minutes and thirty-one seconds (or alternatively, the eighth customer from now will use a credit card).

The instant surveillance system records on the video images (behavioral events) as they transpire. The transaction data packet is stored on the video tape and is also stored by a second recording device, preferably, the record recording device is computer compatible, e.g. computer hard drive, floppy disk, CD Rom, etc. It should be noted that the transaction data may also be stored with the video images.

The surveillance system allows the operator to freeze the data display in the overlay while the video tape is rewound to the beginning of the transaction. The operator can then review the behavioral events while looking at the transaction data in the overlay.

Line markers are provided on the overlay to enable the user to move a pointer on the overlay to each item as it is registered by the clerk in the picture. The system encodes the next transaction serial number on the sound track of the video tape at the end of each transaction. Alternatively, an independent clock can be used to synchronize the data stored on video tape with the data stored in the second medium. The user can use the serial number to be certain that the transaction behavior that he is seeing corresponds to the transaction data in the data overlay.

Figure 13:
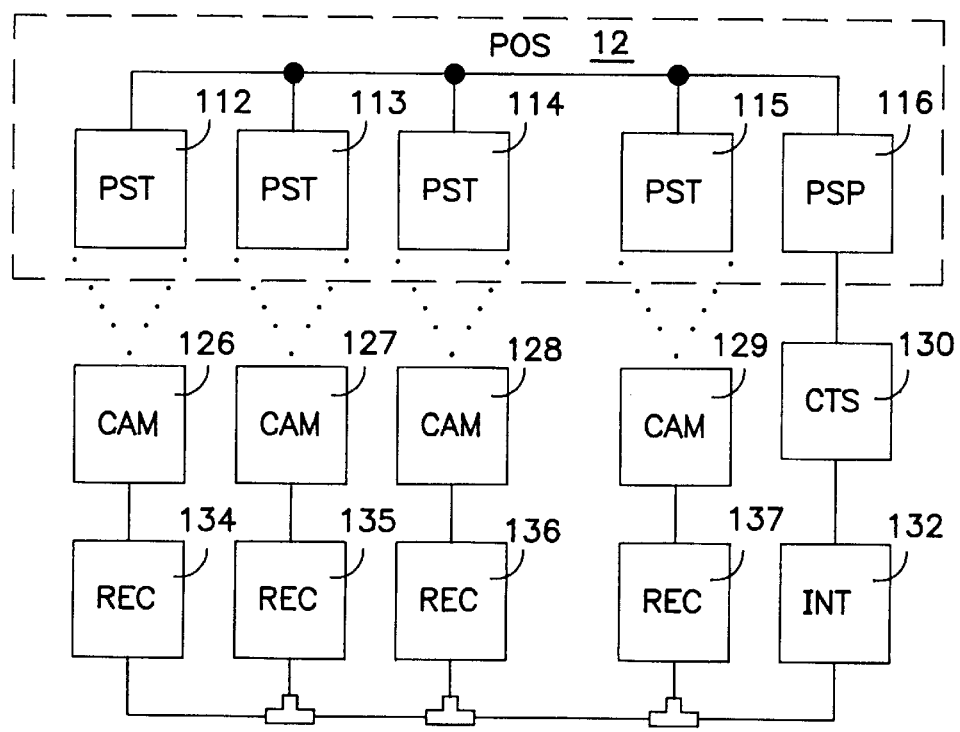
FIG. 13 is a schematic block diagram of a surveillance and transaction recording system for use with multiple point-of-sale terminals in accordance with the present invention.

Referring now to FIG. 13, the surveillance system according to the present invention is shown in which there are multiple cameras and multiple point-of-sale terminals. Each camera 126, 127, 128 . . . can be situated to cover one point-of-sale terminal 112, 113, 114 . . . , or one camera may be situated to cover multiple point-of-sale terminals. The point-of-sale host 116 can provide the timing for the entire surveillance system. However, as described previously, a common time source 130 is preferred. The interface 132 operates in a similar manner as the interface described in FIG. 1. Similarly, the recorders 134, 135, 136 . . . also operate in a similar manner as the recorder 22 described in FIG. 1.

In some point-of-sale systems, the transaction data is stored after the transaction termination time, e.g. some POS systems buffer several transactions before transmission to the host. Therefore, the transaction events cannot be stored simultaneously with the behavioral events.

In certain toll systems, the toll transaction data is stored in a lane controller. The transaction information may come from a toll terminal, card reader, loop detector, treadle, indicator light, etc. located in each toll lane. After the data is stored in the lane controller, it is sent to the plaza controller at irregular intervals. Several transactions take place between data transmissions. For example, five vehicles may have to exit the lane before a transaction is transmitted to the host computer. If several transactions occur before the data is transmitted, there is no method of synchronizing the transaction data with the video images other then the data freeze or data pause method. However, the data pause method is not acceptable to toll authorities, since it requires too much time to review tapes and does not work well with automated tape editing. The solution is to develop circuitry which inputs synchronizing data, encodes it, and stores it along with the video signal. The synchronizing data may be stored on the video tape's sound track, the video tape's vertical interval or within the visible video. The transaction data is stored asynchronously from the behavioral events. However, the transaction data is also stored with the synchronizing signal in a manner that supports synchronizing or re-synchronizing the recorded behavior with the transaction data upon playback.

The AVETDM computer encodes the video tape with identifying indicia, including facility name/number, camera identification, date and time messages. The time messages can be inserted every 100 milliseconds. The AVETDM simultaneously captures the transaction data from the lane controller. These messages include several transactions. Each transaction includes time messages for that transaction. Each transaction message can be stored in a file with the date, lane, terminal identification, etc., and the time.

The file will contain a list of messages indexed by date, time, lane, etc. Upon replay, the user selects the target lane. When the video tape is replayed, the AVETDM inputs the data and time messages. The AVETDM requires the time messages from the tape and looks up the messages in a data file on the disk for that time and target lane. The AVETDM then displays the messages from the targeted lane and the data overlay. In one embodiment, the lane controller stores three transactions and forwards all three at the end of the third transaction to a host computer.

A camera is placed at the toll plaza to view four to six lanes from the exit side. A video tape recorder, for example a VHS video cassette recorder, is connected to each camera. The AVETDM computer is connected to the lane controller communication so that the AVETDM computer receives all of the data messages that are communicated between the lane controller and the plaza computer. The VHS tape is encoded with data messages that identify the plaza and the date. Time messages are encoded every 100 milliseconds. The plaza number, lane number, date and time are stored to the host computer's disk for every transaction message.

When the video tape is replayed, the operator indicates which lane is to be targeted for data to be displayed in the overlay. When a tape is replayed, the time, date, plaza i.d., etc. are recorded on the sound track of the video and are read into the microprocessor 82. The microprocessor 82 reads the time and searches the data file for messages that have the targeted lane identifier and the matching time and date. When the messages are located, they are formatted and displayed in the data overlay. The time of the behavior in the picture now matches the display in the overlay.

Another situation where the AVETDM is necessary is where the POS system data is held until the end of the day or until the POS is closed. Neither way the transaction data is not available in real time. Consider a POS system that holds each transaction inside the POS terminal, and a host collects the held data only after the POS terminal is closed. The data is then stored in the POS system main processor and is made available to the AVETDM via a set of magnetic disks. Time synchronization between the POS system and the AVETDM is achieved by a direct serial link between the POS system main processor and the AVETDM.

The AVETDM will record the video images (behavioral events) of the POS terminal activities but will not be able to record any real time transaction data, as it has not yet left the temporary storage in the POS terminal. Instead the AVETDM records time and identity codes (synchronizing indicia) on the video tape which can be retrieved during playback. These codes will be used to synchronize the transaction and event data received from the POS system with the video images of the POS terminal. Messages coded on the video tape can take the following form:

TIM yyyymmdd hhmmss zz<EOM>
IDN aaaaaa bbbbbb cccccc zz<EOM> where,

TIM is the message header for the time message

IDN is the message header for the identity message yyyymmdd is the date, with yyyy being the year, mm the month, and dd the day hhmmss is the time, with hh being the hours, mm the minutes, and ss the seconds zz is the message checksum <EOM> is the end of message character, which in this case is a line feed (0×0B)

aaaaaa is the customer identity code bbbbbb is the site identity code cccccc is an identity code used to identify different systems within a site The serial interface between the POS system main processor and the AVETDM uses the same time message format that is encoded on the tape. This message originates from the POS system main processor on a frequent periodic basis. For example, many systems make the time and date available when the receipt is printed. The AVETDM receives the message, verifies the checksum, and makes any necessary adjustments to its internal clock. The AVETDM internal clock will thus be synchronized with the POS system clock. The AVETDM will use its internal clock to generate the time messages that are encoded on the tape.

The transaction and event data files consist of individual records detailing each transaction or event. Each of these records must contain a time stamp to allow them to be synchronized with the video stamp and therefore to be synchronized with the video tape. The playback system reads the data file before the tape begins to play. It extracts time data and other identifiers from the message and compares these with the information initially received from the tape as it begins to play. This information will verify that the tape is in fact the one recorded for this particular data. As the tape plays the operator is given details on each transaction at the appropriate time.

The entire transaction data can be loaded into memory before the behavioral recording is replayed. The stored transaction data can then be manipulated by the computer to provide summaries, averages, counts, statistics, anomalies or exceptions. The desired information or anomalies can then be inserted during the replay of the behavioral transaction at the relevant times or sequences. The system can "look into the future" and display a warning message to the operator that a particular anomaly or transaction will occur in X number of frames or in X number of minutes. A control program can be customized to each user to look for particular events and to support this level of operation. Thereby allowing the operator to see transaction data derived from past, present and future behavioral events while viewing the "present"provided by the video tape replay.

An added benefit of the AVETDM system is that because the data is known in advance, the system can warn the operator before items of interest appear on the tape. The general format of the transaction and event data records is as follows:

TRN yyyymmdd hhmmss tttttttttt . . . tttt zz<NL>

The specific details of the transaction record such as type of sale, amount, specific details about the items purchased, etc . . . are not important to the description of the AVETDM system and are simply represented as a series of t's above. The AVETDM will process these specific details in order to extract the information that is to be displayed to the AVETDM system operator.

The transaction record must contain a means for synchronizing the transaction data with the behavioral events recorded on the video tape. The preferred method is to time stamp the transaction data and the recorded behavioral events which allows video and data synchronization. However, other methods of synchronizing may be used. For example, pictorial or graphic recordings may be used. The transaction data system buffers some number of transactions before transmitting to a host computer. If four transactions are buffered, the first transaction is transmitted from the local buffer when the fifth transaction is consummated, the second transaction is sent after the sixth transaction is consummated and so forth. In these instances, the AVETDM can receive the signal that a transaction is being sent and can mark the tape with sequence codes. When the data for the first transaction is sent, the code written on the behavioral recording matches the behavior that coincides with the fifth transaction and so on.

Additional identification details (such as store and customer) might be contained in each transaction record or might appear in a special file identity and description block at the beginning of the file. Either way the correlation between the file and tape can easily be verified.

Another typical situation where the AVETDM is necessary is one where the POS system data is not available in real time, but is available at a slightly later time.

Consider a POS system which does not have its own internal clock or does not produce appropriate synchronizing indicia. Again, this example will use a POS system which holds each transaction inside the POS terminal, and collects the held data only after the POS terminal is closed. The data is then stored in the POS system main processor and is made available to the AVETDM via a set of magnetic disks. Time synchronization between the POS system and the AVETDM is achieved via a time signal receiver. Both the POS system and the AVETDM will connect to time receivers that receive a broadcast time synchronization signal such as the one transmitted by the NIST on WWV and WWVH. (See, for example, FIGS. 9, 10 and 11.)

The AVETDM will record the video images of the POS terminal activities but will not be able to record any real time event and transaction data, as it has not yet left the temporary storage in the POS terminal. Instead the AVETDM records time and identity codes on the video tape that can be retrieved from the POS system with the video images of the POS terminal. Messages coded on the video tape can take the following form:

---
TIM yyyymmdd hhmmss zz<EOM>
IDN aaaaaa bbbbbb cccccc zz<EOM>
--- where,

TIM is the message header for the time message

IDN is the message header for the identity message yyyymmdd is the date, with yyyy being the year, mm the month, and dd the day hhmmss is the time, with hh being the hours, mm the minutes, and ss the seconds zz is the message checksum <EOM> is the end of message character which in this case is a line feed (0×0B)

aaaaaa is the customer identity code bbbbbb is the site identity code cccccc is an identity code used to identify different systems within a site The serial interfaces with the time signal receiver use the same time message format that is encoded on the tape.

This message originates from the time signal receiver on a frequent periodic basis. The AVETDM and POS system receive the message, verify the checksum, and make any necessary adjustments to their internal clocks. The AVETDM internal clock will thus be synchronized with the POS system clock. The AVETDM will use its internal clock to generate the time messages that are encoded on the tape and the POS system will use its clock to timestamp all transaction and event records.

The transaction and event data files consist of individual records detailing each transaction or event. Each of these records must contain a time stamp to allow them to be synchronized with the video tape. The playback system reads the data file before the tape begins to play. It extracts time data and other identifiers from the message and compares these with the information initially received from the tape as it begins to play. This information will verify that the tape is in fact the one recorded for this particular data. As the tape plays the operator is given detail on each transaction at the appropriate time.

What is claimed is:

1. A method for providing verifiable surveillance data by selectively positioning digital data on a video image without obscuring the video image, comprising the steps of:

a) generating video signals of behavioral events corresponding to a desired transaction and marking the video signals with a sequence code from a sequence code source;

b) storing the sequence coded video signals in a predetermined recording medium;

c) generating digital signals representing data for said transaction, said digital signals including signals representing alphanumeric characters corresponding to the transaction, and marking the digital signal with a matching sequence code signal from an electronic system source common to the source in step a);

d) storing the sequence coded digital signal in a recording medium different from said predetermined storage medium;

e) retrieving selected stored video signals via its sequence code signal;

f) retrieving selected stored digital signals via its sequence code signal;

g) forming a composite video-digital signal by selectively superimposing retrieved digital signals on the corresponding retrieved video signals of step e) wherein the digital signals overlie the corresponding behavioral event so as not to obscure the video signal;

h) verifying that the video and digital signals have not been altered or otherwise tampered with; and i) displaying the composite video signal on a monitor.

2. The method in accordance with claim 1 wherein the sequence code signals are independently generated signals synchronized from a common source.

3. The method in accordance with claim 1 wherein a timing signal is generated with said video signal of step a) and with said digital signal of step b), a message checksum is encoded with the video signal, and verification of the checksum is utilized to synchronize said two timing signals.

4. A method in accordance with claim 1 wherein the sequence code of steps a) and b) is a transaction sequence number.

5. A method in accordance with claim 1 wherein a check sum code is encrypted on the video and digital signals to provide a tamper-proof verification of the composite video-digital signals.

* * * * *